US 9,749,142 B2

United States Patent
Przybysz et al.

(12) United States Patent
(10) Patent No.: US 9,749,142 B2
(45) Date of Patent: Aug. 29, 2017

(54) NOTIFICATION OF RESOURCE RESTRICTIONS IN A MULTIMEDIA COMMUNICATIONS NETWORK

(75) Inventors: Hubert Przybysz, Hägersten (SE); David Castellanos, Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 548 days.

(21) Appl. No.: 12/674,395

(22) PCT Filed: Aug. 20, 2007

(86) PCT No.: PCT/EP2007/058639
§ 371 (c)(1),
(2), (4) Date: Apr. 13, 2010

(87) PCT Pub. No.: WO2009/024183
PCT Pub. Date: Feb. 26, 2009

(65) Prior Publication Data
US 2011/0191482 A1   Aug. 4, 2011

(51) Int. Cl.
*G06F 15/16* (2006.01)
*H04L 12/14* (2006.01)
*H04L 29/06* (2006.01)

(52) U.S. Cl.
CPC .......... *H04L 12/14* (2013.01); *H04L 65/1016* (2013.01); *H04L 65/1069* (2013.01); *H04L 65/80* (2013.01)

(58) Field of Classification Search
CPC . H04L 65/1016; H04L 65/1069; H04L 65/80; H04L 12/14

USPC .......................................... 709/225, 227, 228
See application file for complete search history.

(56) References Cited

U.S. PATENT DOCUMENTS

| | | | | |
|---|---|---|---|---|
| 7,948,952 | B2* | 5/2011 | Hurtta | H04M 7/006 370/328 |
| 8,489,096 | B2* | 7/2013 | Rasanen | H04W 36/0038 370/331 |
| 2004/0085942 | A1* | 5/2004 | Le | H04L 63/0892 370/338 |
| 2007/0070958 | A1* | 3/2007 | Rinne et al. | 370/338 |
| 2007/0147244 | A1* | 6/2007 | Rasanen | 370/231 |

(Continued)

OTHER PUBLICATIONS

Universal Mobile Telecommunication System (UMTS); Policy and Charging control over Rx reference point (3GPP TS29,214 version 7.1.0 Release 7); ETSI standards, European Telecommunications standards institute, Sophia-Antipo, FR, vol. 3-CT3, No. V710 Jun. 2007 (pp. 1-36).*

(Continued)

*Primary Examiner* — Dhairya A Patel

(57) ABSTRACT

The invention relates to a method of notifying an Application Function, AF, in a communications network of resource restrictions relating to a communications session. The network includes a Policy and Charging Rules Function, PCRF, for authorising and controlling flows of data in the session. In the method the AF sends an authorisation request to the PCRF for establishing the communication session. The authorisation request includes an indication that the AF is to be notified of resource restrictions for the data flows in the session. The PCRF notifies the AF of the resource restrictions.

26 Claims, 3 Drawing Sheets

(56) References Cited

U.S. PATENT DOCUMENTS

| | | | | |
|---|---|---|---|---|
| 2007/0165630 A1* | 7/2007 | Rasanen | ............ | H04L 12/5695 370/389 |
| 2007/0232301 A1* | 10/2007 | Kueh | .................... | H04W 8/082 455/433 |
| 2007/0281699 A1* | 12/2007 | Rasanen | ........... | H04W 36/0038 455/436 |
| 2008/0046963 A1* | 2/2008 | Grayson | ................ | H04L 12/66 726/1 |
| 2008/0049648 A1* | 2/2008 | Liu et al. | ....................... | 370/310 |
| 2008/0253368 A1* | 10/2008 | Rasanen | ............... | H04L 65/607 370/389 |
| 2009/0141625 A1* | 6/2009 | Ghai | ................... | H04L 12/5695 370/230 |
| 2010/0329129 A1* | 12/2010 | Kroselberg | ............. | H04L 63/08 370/252 |

OTHER PUBLICATIONS

Universal Mobile Telecommunications System (UMTS); Policy and charging control over Rx reference point (3GPP TS 29.214 version 7.1.0 Release 7); ETSI Standards, European Telecommunications Standards Institute. Sophia-Antipo. FR, vol. 3-CT3, No. V710. Jun. 2007.

Ericsson, et al Service Information Accepted by PCRF. 3GPP TSG-CT WG3 Meeting #44, C3-070560, May 2007.

* cited by examiner

NOTIFICATION OF RESOURCE RESTRICTIONS IN A MULTIMEDIA COMMUNICATIONS NETWORK

TECHNICAL FIELD

The invention relates to a method for notifying an Application Function in a communications network of resource restrictions relating to a communications session.

BACKGROUND

The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session. As the number of basic applications, and the media which it is possible to combine, increases, so will the number of services offered to the end users, giving rise to a new generation of personalised, rich multimedia communication services.

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 1 illustrates schematically how the IMS fits into the mobile network architecture in the case of a GPRS/PS access network. As shown in FIG. 1 control of communications occurs at three layers (or planes). The lowest layer is the Connectivity Layer 1, also referred to as the bearer plane and through which signals are directed to/from user terminals accessing the network. The GPRS network includes various GPRS Support Nodes (GSNs). A gateway GPRS support node (GGSN) 2 acts as an interface between the GPRS backbone network and other networks (radio network and the IMS network).

The IMS 3 includes a core network 3a, which operates over the middle, Control Layer 4 and the Connectivity Layer 1, and a Service Network 3b. The IMS core network 3a includes nodes that send/receive signals to/from the GPRS network via the GGSN 2a at the Connectivity Layer 1 and network nodes that include Call/Session Control Functions (CSCFs) 5, which operate as SIP proxies within the IMS in the middle, Control Layer. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

At the top is the Application Layer 6, which includes the IMS service network 3b. Application Servers (ASs) 7 are provided for implementing IMS service functionality. Application Servers 7 provide services to end-users, and may be connected either as end-points, or "linked in" by an S-CSCF. Certain Application Servers 7 will perform actions dependent upon subscriber identities (either the called or calling subscriber, whichever is "owned" by the network controlling the Application Server 7).

The IMS architecture makes it possible to deploy peer-to-peer applications where two or more users exchange data during a SIP session. Examples of such peer-to-peer applications include Multimedia Telephony (MMTel), Push to Talk over Cellular (PoC), streaming, real-time video sharing, file sharing, gaming etc. The transport connection(s) is (are) negotiated dynamically by means of the SIP/SDP protocol exchange between the two end points (user terminals).

However, in order to support such peer-to-peer applications, there are two basic requirements: (i) a mechanism is needed to selectively control the SIP signal flows associated with the IMS session(s) of a subscriber; and (ii) a functionality is needed to control the IP flows through the dynamically negotiated transport connections in order to apply an effective charging for usage of services. One important aspect concerns the resources required for the session, which will impact on the Quality of Service (QoS) provided for the session (e.g. the data rate at which data is transferred between the end users). In the discussion below the term QoS is used to refer to those parameters of a requested or on-going session that determine the Quality of the session Service experienced by the end user. The principal bearer resource characteristic affecting QoS is the available bandwidth for the session.

3GPP has recognised such needs and is currently defining a Policy and Charging Control (PCC) Architecture (see 3GPP TS 23.203 [1]). FIG. 2 presents the basic outline of the PCC architecture. The Application Function (AF) 16 is an element offering applications that require dynamic policy and/or charging control of traffic plane resources. Although the application services are initiated and service characteristics are negotiated at the Application Layer 6 (e.g. by an Application Server 7—see FIG. 1), in the case of the IMS the P-CSCF plays the role of the AF 16 at the SIP signalling plane (Control Layer 4). A Policy and Charging Enforcement Function (PCEF) 12 in the Connectivity Layer 1 monitors service data flow and enforces network policy on the user plane traffic. The PCEF 12 also applies charging based on the monitored data flow and the charging policy applied. This information is provided to an Online Charging System 13 over the Gy interface. Within a GPRS access network, the PCEF 12 is located in the GGSN 2a. Within the Systems Architecture Evolution defined in 3GPP Release 8, the PCEF is located in the PDN gateway.

A Policy and Charging Rules Function (PCRF) 14 resides in between the AF 16 and the PCEF 12. The PCRF 14 is the entity that controls charging based on the monitored data flow. The PCRF 14 obtains rules relating to the charging policy to be applied for particular subscribers over the Sp interface from a Subscription Profile Repository (SPR) 18, which includes a database of subscriber information. The PCRF 14 installs these PCC rules at the PCEF 12 over the Gx interface. These ensure that only authorized media flows associated with the requested services are allowed. In addition, the PCC rules installed at the PCEF 12 ensure that the right bandwidth, charging and priority are applied through the right bearer.

Once session characteristics are negotiated between the communication peers and the session characteristics are authorized within the IMS Core Network 3a, the AF 16 provides to the PCRF 14 an authorization of bearer resources over the Rx interface so that the corresponding resource reservation can be authorized at the Connectivity Layer 1.

However, there could be circumstances when the corresponding resource reservation cannot be authorised at the bearer layer. One such reason, for example, could be that the access operator has established restrictions on bandwidth consumption for their users or for that particular user. Under these circumstances, the current specification in 3GPP TS 29.214 [2], states that:

"The PCRF shall process the received Service Information according to the operator policy and may decide whether the request is accepted or not."

However, it is not specified what the PCRF 14 does when the request is not accepted. In the absence of any explicitly defined mechanism, it can be assumed that the PCRF 14 must be configured according to the operator's preferences. This may, or may not include feedback of information to the AF 16 regarding the reason for not accepting the request. Currently the PCRF 14 does not know if the AF 16 requires such information and will therefore perform its processing (however configured) regardless of any AF preferences.

For example, it may be possible for session services of a requested peer-to-peer session that has been rejected due bandwidth restrictions to be provided at a lower bandwidth, at least for certain media types, so that the session could be allowed to proceed at a lower QoS. If information concerning the bandwidth restrictions affecting the rejected session request is made available, this could be used to initiate a modified session request. The modified request could be initiated from the AF itself, but would normally be initiated by the UE after it has been made aware of the restrictions either by the AF 16 or directly from the Connectivity Layer 1. Therefore, it can only be the AF 16 that knows whether or not the indication of bandwidth restriction is relevant for the AF 16 in order to modify the session request or to inform the UE of the allowable bandwidth for the session.

Moreover, even when the indication of bandwidth restriction is relevant for the AF 16, it is only the AF 16 that knows in which specific format it requires the information. If the PCRF 14 is configured in a certain way, it is possible that it will not feed back the information required, or not in the correct format, for this to be used by the AF 16. For example, the PCRF 14 might be configured to compute the available bandwidth and provide this information to the AF 16 in one particular format (e.g. total available bandwidth for the session) when the AF 16 actually requires the available bandwidth per media component.

The present invention has been conceived with the foregoing in mind.

SUMMARY

According to a first aspect of the present invention there is provided a method of notifying an Application Function, AF, in a communications network of resource restrictions relating to a communication session. The network includes a Policy and Charging Rules Function, PCRF, for authorising and controlling flows of data in the session. The AF sends an authorisation request to the PCRF for establishing the communication session. The authorisation request includes an indication that the AF is to be notified of resource restrictions for the data flows in the session. The PCRF notifies the AF of the resource restrictions.

It is an advantage that the AF can indicate its desire to receive available bandwidth information from the PCRF. This information may then be used to modify session requests.

The communications session may be a multimedia session, the PCRF authorising and controlling flows of data for each of a plurality of media components in the multimedia session. The AF may be comprised in a Proxy Call/Session Control Function in an IMS network.

In Embodiments of the invention, the PCRF notifies the AF of the resource restrictions in an authorisation response message, which indicates whether or not the requested session is allowed to proceed. The indication in the authorisation request may include a request for the AF to be informed of bandwidth restrictions in the event that the requested session is not allowed to proceed due to a requested bandwidth exceeding a bandwidth restriction. The indication may specify one of a plurality of levels at which the AF is to be notified of bandwidth restrictions, the plurality of levels including a total session bandwidth level and a per media component level.

It is an advantage that the PCRF is informed of the AF's preferences for notification of resource restrictions and can take account of this in its processing so that it can provide the required information to the AF in the correct format.

In embodiments of the invention the method further comprises notifying the AF of any violation to the resource restrictions that apply during an on-going session. The PCRF may send a Re-Authorisation Request message that includes notification of changes to resource restrictions to the AF. On receipt of the Re-Authorisation Request the AF may determine whether or not the session can progress with the notified restrictions, and if it cannot progress may request the termination of the session. This may involve the AF sending a Session Termination Request to the PCRF.

It is an advantage that the decision about terminating or continuing the session can be made by the AF, rather than having the decision made for it by the PCRF.

In embodiments of the invention the indication that the AF is to be notified of resource restrictions comprises a Specific-Action Attribute Value Pair, AVP, in the authorisation request message. The authorisation request message may further comprise an Available-Bandwidth-Info AVP indicating the form in which the AF is to be notified of resource restrictions. The notification of resource restrictions may comprise a Supported-Service-Info AVP providing the information of the resources that would be available for the AF session in accordance with the form indicated in the Available-Bandwidth-Info AVP.

According to a second aspect of the present invention there is provided an Application Function, AF, in a communications network for providing application sessions between user terminals communicating over the network. The AF comprises means for sending a session authorisation request to a Policy and Charging Rules Function, PCRF, in the network. The session authorisation request includes an indication that the AF is to be notified of resource restrictions for data flows in the session. The AF also comprises means for receiving a notification of the resource restrictions.

The Application Function may be configured to provide multimedia application sessions. The Application Function may be comprised in a Proxy Call/Session Control Function in an IMS network.

In embodiments of the Application Function the indication in the session authorisation request specifies one of a plurality of levels at which the AF is to be notified of bandwidth restrictions, the plurality of levels including a total session bandwidth level and a per media component level.

In embodiments of the Application Function the notification of resource restrictions is included in an authorisation response message which indicates whether or not the requested session will receive the required resources as requested.

The Application Function may be configured to provide information relating to the notified resource restrictions to the one or more of the user terminals participating in the session.

Embodiments of the Application Function may be configured to modify the session authorisation request to comply with said resource restrictions. The Application Function may be configured to inform at least one of the user terminals of the modification to the session authorisation request. The Application Function may be configured to send the modified session authorisation request to the PCRF.

According to a third aspect of the present invention there is provided a Policy and Charging Rules Function, PCRF, in a communications network configured to authorise and control flows of data for a session between user terminals communicating over the network. The PCRF comprises means for receiving a session authorisation request from an Application Function in the network. The session authorisation request includes an indication that the Application Function is to be notified of resource restrictions for data flows in the session. The PCRF also comprises means for sending a notification of resource restrictions to the Application Function.

The PCRF may be configured to authorise and control flows of data for each of a plurality of media components in a multimedia session.

In embodiments of the PCRF the authorisation request from the Application Function includes an indication specifying one of a plurality of levels at which the Application Function is to be notified of resource restrictions, the plurality of levels including a total session bandwidth level and a per media component level, and the means for sending a notification of bandwidth restrictions includes means for sending a notification at the specified level.

The PCRF may be configured to store in a memory said indication specifying the level at which the Application Function is to be notified of resource restrictions.

The PCRF may be configured to notify said Application Function of subsequent violations to resource restrictions during an on-going session in accordance with said stored indication.

BRIEF DESCRIPTION OF THE DRAWINGS

Embodiments of the invention are described below with reference to the drawings, in which.

DETAILED DESCRIPTION

Figure 1:
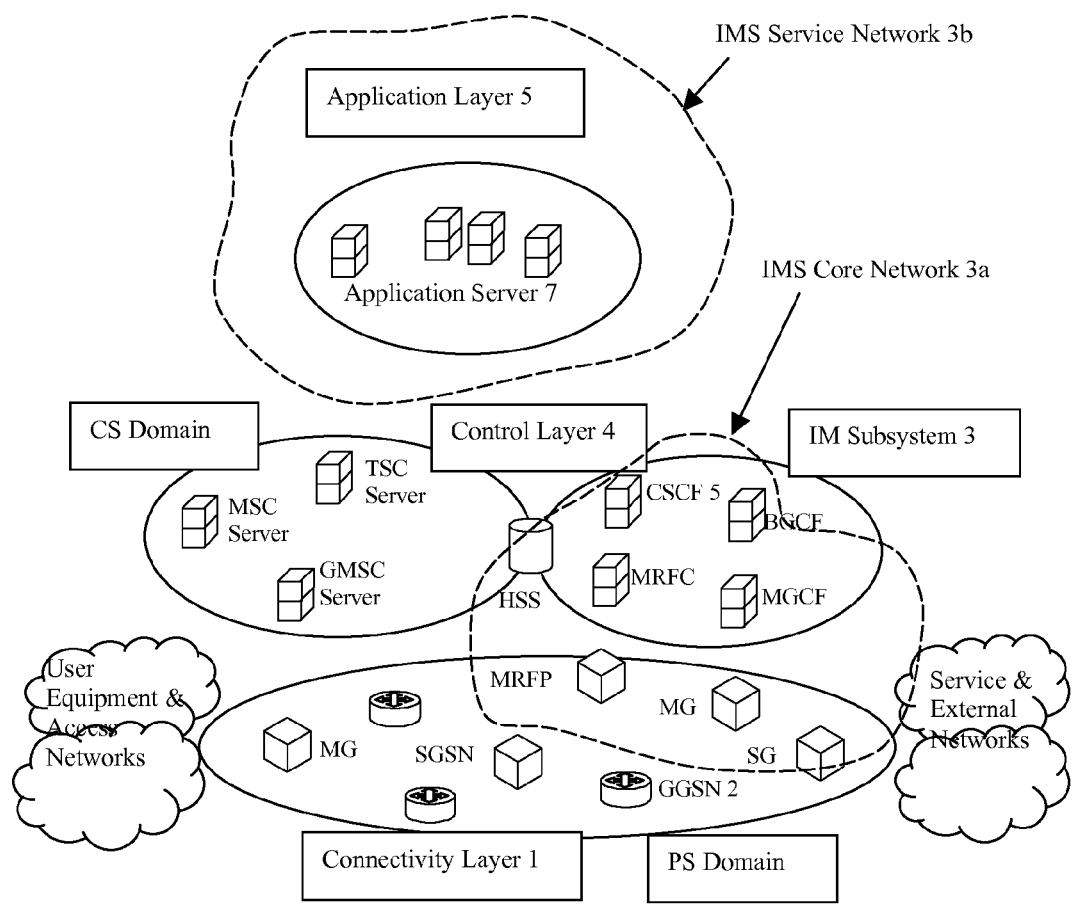
FIG. 1 is a schematic illustration of a GPRS/PS access network showing how the IMS fits into the mobile network architecture.
Figure 2:
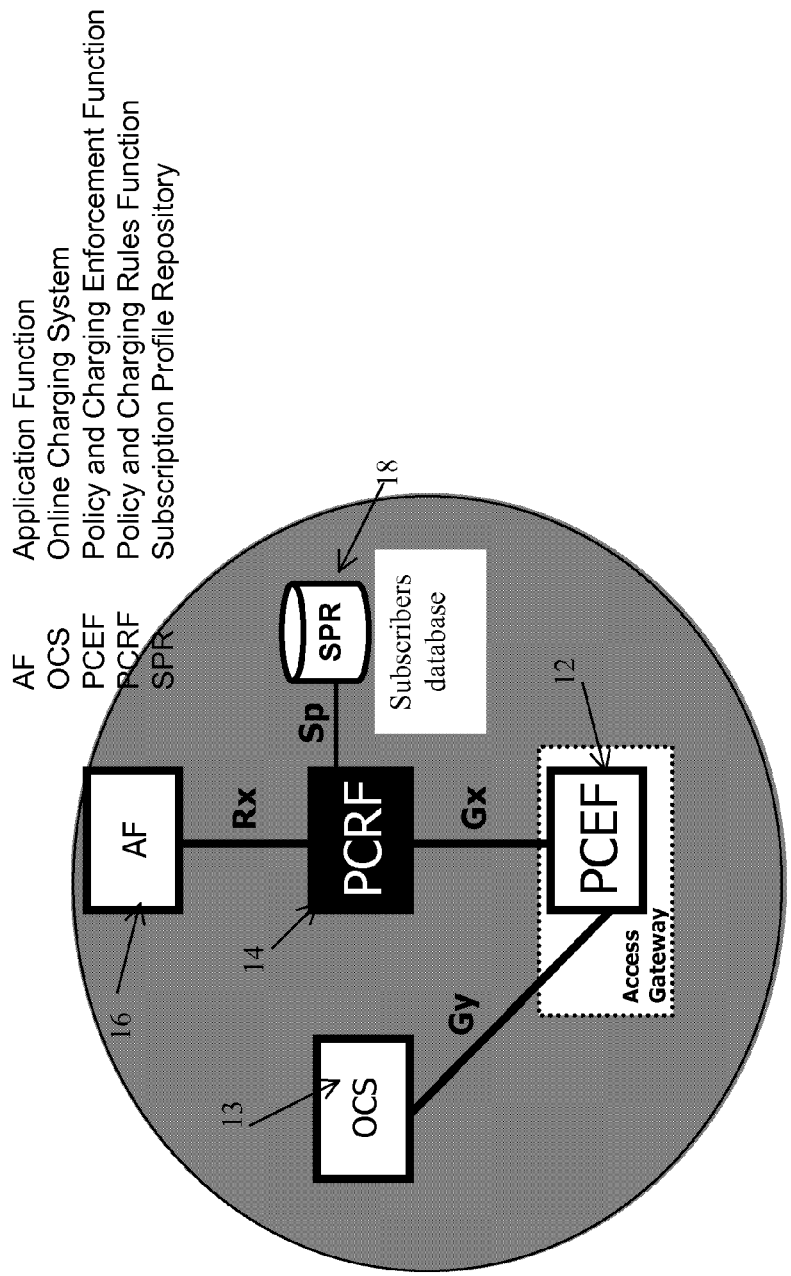
FIG. 2 is a schematic illustration of the network entity architecture a Policy and Charging Control (PCC) system.
Figure 3:
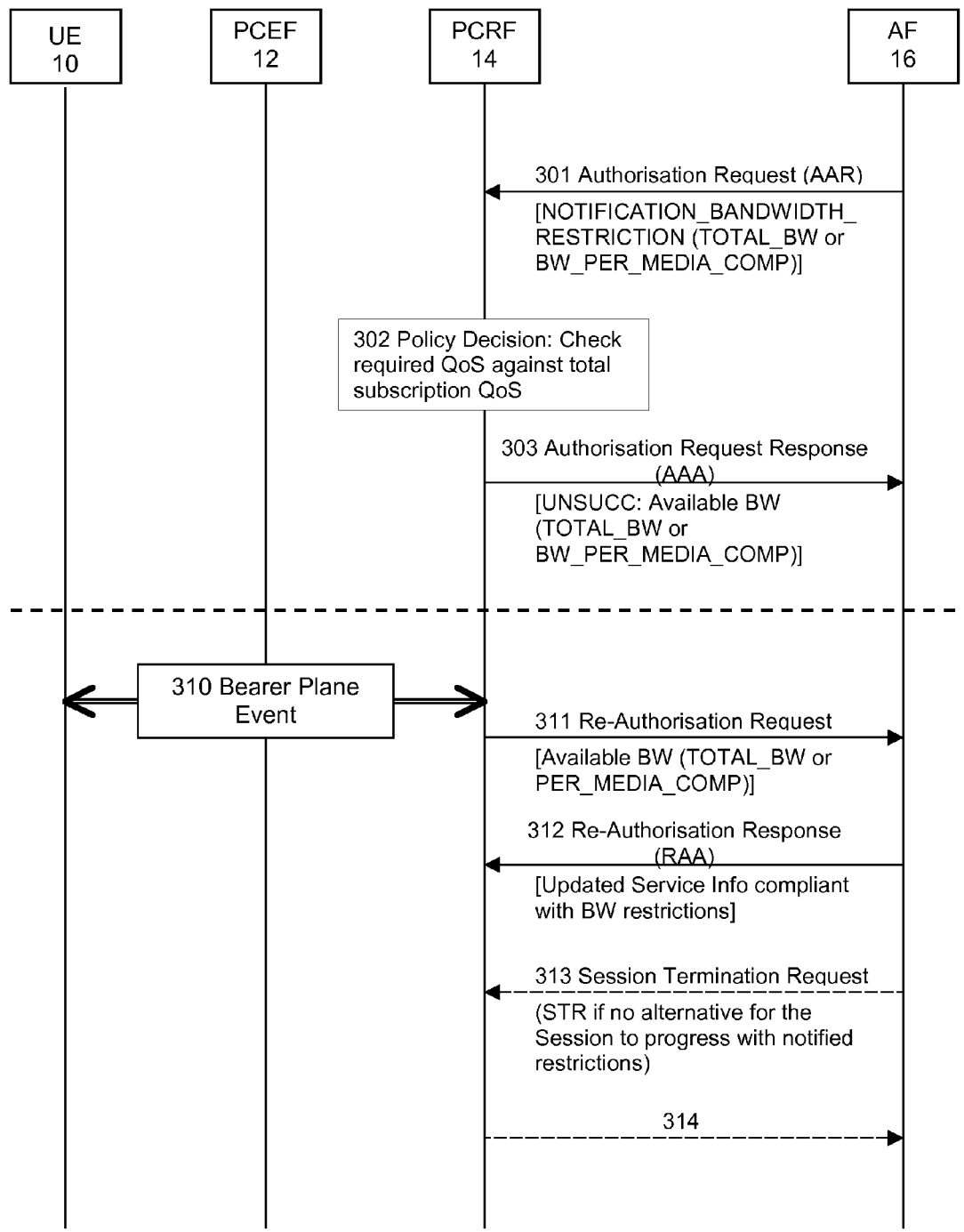
FIG. 3 is an illustration of the signal flows between a UE and PCC entities in accordance with embodiments of the invention.

FIG. 3 illustrates the signal flows between the PCC nodes for a user terminal (UE) 10, which has registered with the IMS and has attempted to initiate a peer-to-peer multimedia application session with another UE (not shown). The application, which requires dynamic policy and/or charging control of resources is offered by an AF 16. When the session initiation request is first received from the UE 10 by the IMS core network, the request is forwarded to the AF 16. At step 301 in FIG. 3 the AF 16 then sends an authorisation request (AAR) to the PCRF 14 over the Rx interface (see FIG. 2). In accordance with the established function of the PCC, the authorisation request will specify the required QoS resources for the session. At step 302, the PCRF 14 checks to see if the requested QoS resources can be provided in view of the restrictions imposed by the network. These may be network-wide restrictions, or restrictions imposed on the particular subscriber. At step 303, the PCRF 14 sends an Authorisation Request Response (AAA) back to the AF 16. If the QoS resources requested do not exceed any restrictions, then the AAA will simply allow the session to proceed.

The present invention is concerned with what happens when the requested QoS resources cannot be provided due to restrictions in the Connectivity Layer. The basic concept of the invention involves providing the AF 16 with means for explicitly requesting the notification of restrictions when the authorization of QoS resources is rejected by the PCRF 14. The principal bearer resource characteristic affecting QoS is the available bandwidth for the session, and the discussion below focuses on bandwidth restrictions. However, it will be appreciated that there may be other resources that could affect QoS, such as certain media characteristics, and for which the principles of the invention could also be applied.

In an embodiment shown in FIG. 3, if the AF 16 requires notification of bandwidth limitations it provides an explicit indication to the PCRF 14 within the initial AAR. This indication also includes the AF preferences regarding the notification of bandwidth restrictions (for the total session bandwidth or for the bandwidth per media component). Accordingly, if the service information provided in the AAR is rejected (e.g. the subscriber's guaranteed bandwidth QoS is exceeded), the PCRF 14 provides the bandwidth available for the rejected session request, if requested according to the AF preferences expressed in the initial AAR.

As shown in FIG. 3, the mechanism involves the introduction of additional information elements within the AAR sent to the PCRF 14 over the Rx interface at step 301 of FIG. 3. The additional information includes an explicit request [NOTIFICATION_BANDWIDTH_RESTRICTION] to be informed of bandwidth restrictions in the case the processing of the AAR command is unsuccessful due to this reason. The additional information also includes a preference for the format in which the bandwidth restrictions should be provided to the AF 16. This may be for the whole AF session [TOTAL_BW] or for each media component [BW_PER_MEDIA_COMP]. This additional information will be discussed in more detail hereafter.

This additional information, when processed by the PCRF 14, causes it to determine the bandwidth restrictions and to inform the AF 16 accordingly if required. This is done at step 303 in FIG. 3 by including the information in the AAA response.

A further refinement is shown in the lower part of FIG. 3. Here, there is an on-going session involving the UE 10 where the PCEF 12 is monitoring the data traffic. Also, the PCRF 14 has stored the additional information including the AF preferences indicated by the AF 16 in the initial AAR at step 301 in a memory for the lifetime of the AF session. At step 310 a bearer plane event (e.g. loss or release of a bearer previously handling media IP flows for one particular user) takes place. This is notified to the PCRF 14 over the Gx interface from the Connectivity Layer. This means that the required QoS resources according to the service information provided in the initial AAR from the AF 16, which was originally accepted, can no longer be guaranteed. Since, in this case the PCRF 14 had stored the AF preferences indicated by the AF 16 in the initial AAR for the lifetime of the AF session, then, according to this embodiment, the PCRF can provide updated information about any changes to the available bandwidth for the AF session to the AF 16 if the AF had requested it and in accordance with the AF preferences.

In this case, the notification of available bandwidth to the AF 16 is included within a Re-Authorisation Request (RAR) sent from the PCRF 14 to the AF 16 at step 311. The up-dated available bandwidth is sent with the RAR in accordance with the stored AF preferences (either specifying the total available session bandwidth, or specifying the available bandwidth per media component). At step 312 the AF 16 responds by sending a Re-Authorisation Response (RAA) to the PCRF 14. This RAA may include a modified request for QoS resources that complies with the restrictions so that the AF session can continue (although with modifications to the Authorized QoS resources). If at this point the AF determines that the AF session cannot progress with the notified restrictions, the AF 16 additionally requests the termination of the Rx session. In that case, as shown at step 313, the AF 16 sends a Session Termination Request to the PCRF 14. At step 314, the PCRF responds by confirming that session is terminated.

In the embodiments shown in FIG. 3 the request and further notification of bandwidth restrictions are handled within the current framework for notifications over the Rx interface, and are included as a new trigger within the existing Specific-Action Attribute Value Pair (AVP). A new value for the Specific-Action AVP is then defined as follows.
NOTIFICATION_OF_BANDWIDTH_RESTRICTIONS In the AAR, this value indicates that the AF requests the PCRF to provide a notification in the event that bandwidth limitations are experienced. (The AAR will also include the AF preferences for the form in which the bandwidth restriction information is to be provided by the PCRF, which will be included within a new "Available-Bandwidth-Info" AVP—see below).

Within the AAA, this value is used when the PCRF experiences bandwidth limitations during initial provisioning of session information or during subsequent modification of session characteristics (e.g. addition of a new media type).

Within the RAR, this value is used when the PCRF experiences bandwidth limitations due to bearer plane events and not all the service data flows within the AF session are affected.

If this value is not included within the Specific-Action AVP within the AAR request, the AF will not be informed of the bandwidth that would be available for the requested AF session. In that case an AF session establishment or modification may be rejected by the PCRF, but the PCRF will not send information about bandwidth limitations to the AF. Also, if the value is not included within the Specific-Action AVP of the initial AAR, the PCRF will not notify the AF of subsequent bandwidth restrictions experienced.

Otherwise, if this value is included within the Specific-Action AVP within the AAR request the AAR will also include an "Available-Bandwidth-Info" AVP. This expresses the AF preferences for the form in which it requires the information about bandwidth restrictions.

When the AAR includes the "Available-Bandwidth-Info" AVP, the PCRF will also include within an AAA or RAR an Available-Service-Info AVP (as defined in 3GPP Change Request C3-070716. The Supported-Service-Info AVP provides the information of the bandwidth that would be available for the AF session following the preferences expressed by the AF.

The "Available-Bandwidth-Info" AVP may be defined of type Enumerated, with the following values:
Total-Bandwidth (1)

This value is used when the AF requires to be notified of the total available bandwidth for the whole AF session (e.g. when an AA-Request cannot be accepted by the PCRF due to bandwidth restrictions).
Per-Media-Component (2)

This value is used when the AF requires to be notified of the available bandwidth for the different media components within the AF session (e.g. when an AA-Request cannot be accepted by the PCRF due to bandwidth restrictions).

The invention claimed is:

1. A method of notifying an Application Function (AF) in a communications network of resource restrictions relating to a communication session, wherein the network comprises a Policy and Charging Rules Function (PCRF) for authorizing and controlling flows of data in the session, the method comprising:
the AF sending an authorization request to the PCRF for establishing the communication session, wherein the authorization request specifies required Quality of Service (QoS) resources for the communication session and includes a request to the PCRF that the AF is to be notified of restrictions to the QoS resources available for the data flows in the requested session in order for the session to proceed; and
the PCRF notifying the AF of said resource restrictions in an authorization response message indicating the requested session is not allowed to proceed.

2. The method of claim 1, wherein the communications session is a multimedia session, the PCRF authorizing and controlling flows of data for each of a plurality of media components in the multimedia session.

3. The method of claim 2, wherein the AF is comprised in a Proxy Call/Session Control Function in an IMS network.

4. The method of claim 1, wherein the request that the AF is to be notified includes a request for the AF to be informed of bandwidth restrictions in the event that the requested session is not allowed to proceed due to a requested bandwidth exceeding a bandwidth restriction.

5. The method of claim 4, wherein the request that the AF is to be informed of bandwidth restrictions specifies one of a plurality of levels at which the AF is to be notified of bandwidth restrictions, the plurality of levels including a total session bandwidth level and a per media component level.

6. The method of claim 1, further comprising notifying the AF of any violation to the resource restrictions that apply during an on-going session.

7. The method of claim 6, wherein the PCRF sends a Re-Authorization Request message that includes notification of changes to resource restrictions to the AF.

8. The method of claim 7, wherein on receipt of the Re-Authorization Request the AF determines whether or not the session can progress with the notified restrictions, and if it cannot progress requests the termination of the session.

9. The method of claim 8, wherein the AF sends a Session Termination Request to the PCRF.

10. The method of claim 1, wherein the request that the AF is to be notified of resource restrictions comprises a Specific-Action Attribute Value Pair (AVP) in the authorization request message.

11. The method of claim 10, wherein the authorization request message further comprises an Available-Bandwidth-Info AVP indicating the form in which the AF is to be notified of resource restrictions.

12. The method of claim 11, wherein the notification of resource restrictions comprises a Supported-Service-Info AVP providing the information of the resources that would be available for the AF session in accordance with the form indicated in the Available-Bandwidth-Info AVP.

13. An Application Function (AF) for providing application sessions between user terminals communicating over a communications network, the AF comprising:
- persistent memory in which is stored operating instructions; and
- a processor in communication with the persistent memory to execute the operating instructions, whereby the AF is operable to:
  - send a session authorization request to a Policy and Charging Rules Function (PCRF) in the network, the session authorization request specifying required Quality of Service (QoS) resources for the session and including a request to the PCRF that the AF is to be notified of restrictions to the QoS resources available for data flows in the requested session in order for the session to proceed, and
  - receive a notification of the resource restrictions in an authorization response message indicating the requested session is not allowed to proceed.

14. The Application Function of claim 13, configured to provide multimedia application sessions.

15. The Application Function of claim 14, comprised in a Proxy Call/Session Control Function in an IMS network.

16. The Application Function of claim 14, wherein the request that the AF is to be notified of restrictions specifies one of a plurality of levels at which the AF is to be notified of bandwidth restrictions, the plurality of levels including a total session bandwidth level and a per media component level.

17. The Application Function of claim 13, wherein the notification of resource restrictions is included in an authorization response message which indicates whether or not the requested session will receive the required resources as requested.

18. The Application Function of claim 13, configured to provide information relating to the notified resource restrictions to the one or more of the user terminals participating in the session.

19. The Application Function of claim 13, configured to modify the session authorization request to comply with said resource restrictions.

20. The Application Function of claim 19, configured to inform at least one of the user terminals of the modification to the session authorization request.

21. The Application Function of claim 19, configured to send the modified session authorization request to the PCRF.

22. A Policy and Charging Rules Function (PCRF) for providing application sessions between user terminals communicating over a communications network, the PCRF comprising:
- persistent memory in which is stored operating instructions; and
- a processor in communication with the persistent memory to execute the operating instructions, whereby the PCRF is operable to:
  - receive a session authorization request from an Application Function (AF) in the network, the AF configured to authorize and control flows of data for a session between user terminals communicating over the network, the session authorization request specifying required Quality of Service (QoS) resources for the session and including a request to the PCRF that the Application Function is to be notified of restrictions to the QoS resources available for data flows in the session in order for the session to proceed, and
  - send a notification of resource restrictions to the Application Function in an authorization response message indicating the requested session is not allowed to proceed.

23. The PCRF of claim 22, configured to authorize and control flows of data for each of a plurality of media components in a multimedia session.

24. The PCRF of claim 22, wherein the request that the AF is to be notified of restrictions in the authorization request from the AF specifies one of a plurality of levels at which the AF is to be notified of resource restrictions, the plurality of levels including a total session bandwidth level and a per media component level, and the means for sending a notification of bandwidth restrictions includes means for sending a notification at the specified level.

25. The PCRF of claim 24, configured to store in a memory said request specifying the level at which the Application Function is to be notified of resource restrictions.

26. The PCRF of claim 25, configured to notify said Application Function of subsequent violations to resource restrictions during an on-going session in accordance with said stored indication.

* * * * *